Dec. 7, 1965  Q. A. HANSEN  3,221,845
SPRING-APPLIED MAGNETICALLY-RELEASED BRAKE
Filed March 4, 1963  2 Sheets-Sheet 1
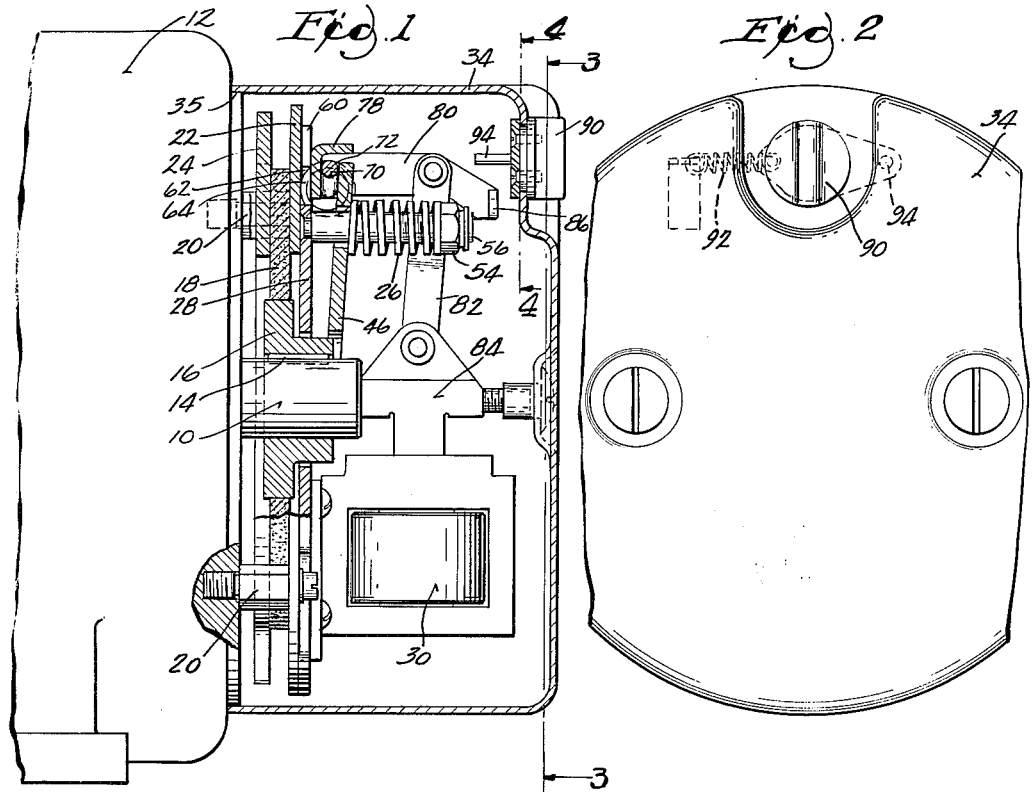
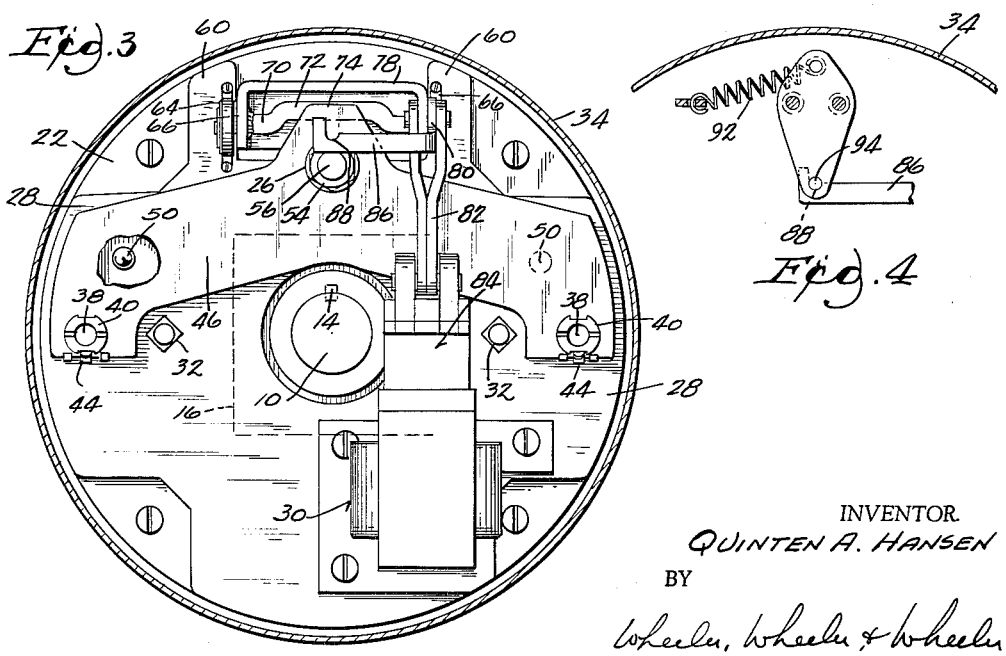
INVENTOR.
QUINTEN A. HANSEN
BY
Wheeler, Wheeler & Wheeler
ATTORNEYS Dec. 7, 1965 Q. A. HANSEN 3,221,845
SPRING-APPLIED MAGNETICALLY-RELEASED BRAKE
Filed March 4, 1963 2 Sheets-Sheet 2
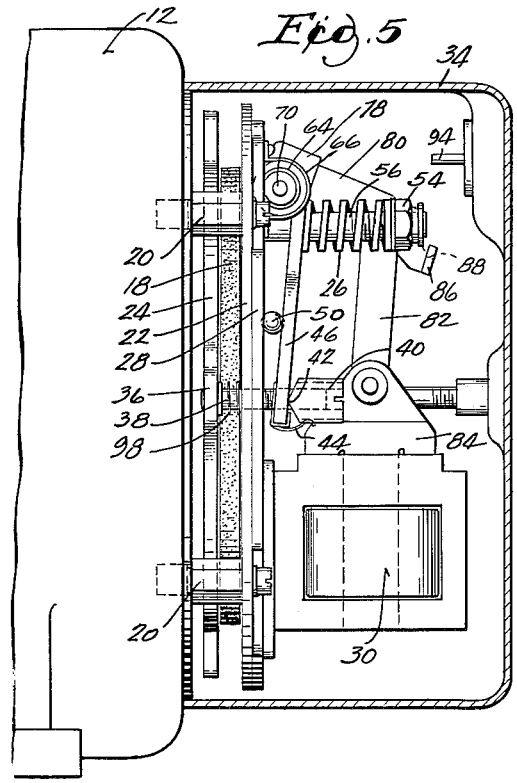
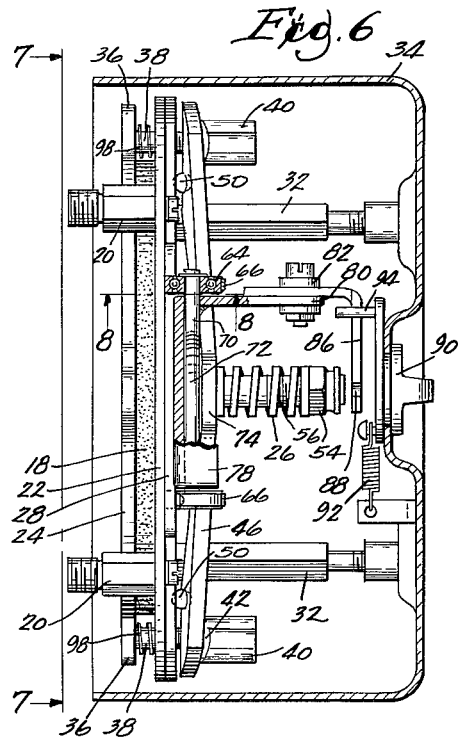
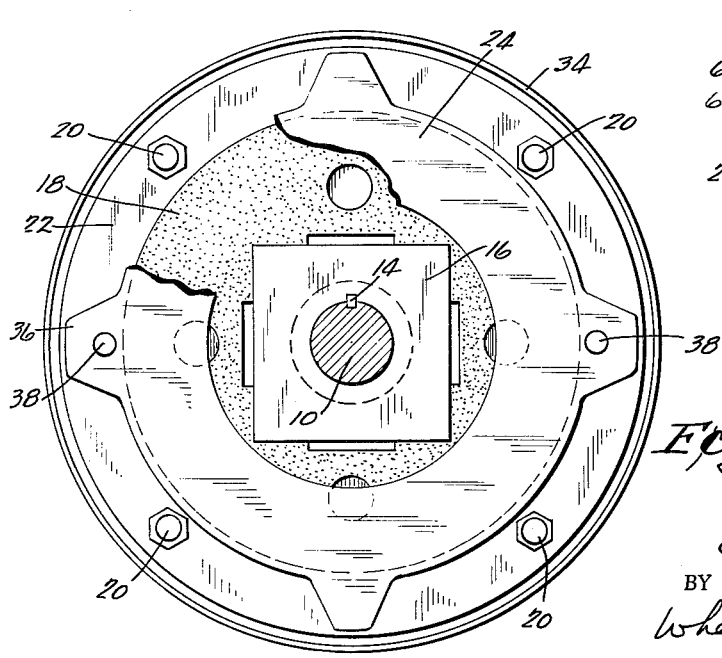
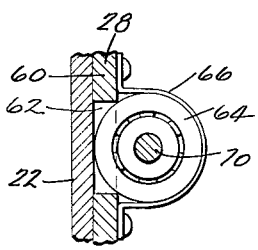
INVENTOR.
QUINTEN A. HANSEN
BY
Wheeler, Wheeler & Wheeler
ATTORNEYS United States Patent Office 3,221,845
Patented Dec. 7, 1965

3,221,845
SPRING-APPLIED MAGNETICALLY-RELEASED BRAKE
Quinten A. Hansen, Franksville, Wis., assignor to R. H. Stearns and R. N. Stearns, both of Milwaukee, Wis.
Filed Mar. 4, 1963, Ser. No. 262,675
11 Claims. (Cl. 188—171)

This invention relates to a spring-applied magnetically released brake mechanism. In the embodiment selected to exemplify the invention, the brake is applicable to an electric motor to arrest the motion of the armature shaft as soon as the motor is de-energized.

It is an object of the invention to simplify and render less expensive brake mechanisms of the indicated type. Instead of using the housing as a support for the operating parts, the mechanism is mounted on a frame and the operating parts may be connected to any shaft or the like to be controlled by the brake. Since the housing is independent of the frame and mechanism, it is possible to reduce materially the weight and cost of the housing.

Machining expense is greatly reduced by arrangements which make it possible to use stamped parts instead of machined parts and conventional inexpensive prefabricated bearings in lieu of specially machined bearings. A brake as herein disclosed weighs less than half as much as a brake of comparable performance produced prior to this invention. The need for an end plate is eliminated and installation is simplified.

In the drawings:

FIG. 1 is a view in axial section through a brake structure embodying the invention as it appears when applied to a fragmentarily illustrated motor shell.

FIG. 2 is a fragmentary end elevation of the housing.

FIG. 3 is a detail view taken in section on line 3—3 of FIG. 1.

FIG. 4 is a fragmentary view taken in section on the line 4—4 of FIG. 1.

FIG. 5 is a view of the mechanism in side elevation, the housing being shown in vertical axial section and the parts being illustrated in brake releasing position.

FIG. 6 is a plan view of the brake mechanism with the shell shown in horizontal axial section, parts being broken away.

FIG. 7 is a view of the brake mechanism in end elevation from the point indicated on the line 7—7 of FIG. 6, portions of one of the disks being broken away.

FIG. 8 is a fragmentary enlarged detail view on the line 8—8 of FIG. 6.

The motor armature shaft 10 projects as usual from the motor shell or housing 12. It constitutes a rotor which is provided with a key 14 for the square hub 16 upon which one or more brake disks 18 may be mounted, the arrangement being representative of any means by which a disk 18 may be floated for movement axially of the shaft 10 while constrained to rotate therewith. Brake disk 18 is preferably non-metallic.

The shoulder bolts 20 support from the motor shell 12 a plate 22 constituting a fixed brake disk to which the disk 18 connected with the armature shaft may be clamped by the movable brake disk 24 when the latter is moved outwardly toward disk 22 by the bias of compression spring 26 acting through mechanism hereinafter described.

A separate mounting plate 28 is desirably laminated by spot welding or otherwise to the brake disk 22 in the particular embodiment selected to exemplify the invention. This arrangement has several advantages: In the first place, it is a very convenient way of providing notches and recesses which are made by stamping metal from the mounting plate 28 which would have to be removed by machining if the brake disk 22 and mounting plate 28 were integral. In the second place, it permits the brake disk 22 to be made of different metal from the mounting plate 28, if desired. In the third place, it permits the brake disk 22 to be relatively light.

The solenoid magnet 30 is mounted on plate 28. Likewise mounted thereon are the rearwardly projecting studs 32 to which the housing 34 is attached. The housing may be a relatively lightweight stamping and is marginally engaged about the shoulder 35 with which the motor shell is conventionally provided.

The brake disk 24 has laterally projecting ears 36 in which the studs 38 are mounted to project rearwardly outside the periphery of the floating disk 18 keyed to the armature shaft 10. The studs 38 extend loosely through the fixed brake disk 22 and mounting plate 28 to carry fulcrum heads 40 which are here shown as nuts which have transversely beveled wedge-shaped ends 42 as best shown in FIG. 5. These studs guide the brake disk 24 to and from clamping engagement with floating disks 18, thus eliminating any external guiding frame such as has heretofore been employed. Spring detents 44 connected with yoke lever 46 are engaged with the nuts 40 as best shown in FIG. 3, thereby securing the nuts in adjusted position with their apices in transverse alignment as shown in FIGS. 5 and 6.

Shallow pockets stamped in plate 28 and lever 46 partially receive conventional bearing balls 50 at both sides of the mounting plate and upon which the yoke lever 46 is pivoted. Below the balls the yoke lever engages the apices 42 of nuts 40. Above the balls the yoke lever is engaged by the compression spring 26. The outer end of the spring is seated on an adjusting nut 54 on stud 56 which is fixed in the frame plate 28 and projects rearwardly through an aperture 58 in the yoke lever 46. Thus the bias of spring 26 is transmitted through the yoke lever 46 to oscillate the lever upon the fulcrum provided by balls 50, thereby to exert rearward pressure on the nuts 40 and studs 38 to draw the movable third brake disk 24 toward the fixed first brake disk 22, thereby clamping the rotatable second brake disk 18 carried by the armature shaft. This brakes the armature shaft. It will be observed that the clamping movement which brings about braking action occurs in a direction away from the motor, whereas in many prior art devices of this character the clamping action is directed toward the motor.

The upstanding arms 60 of the crank plate 28 have slots 62 in which conventional ball bearing assemblies 64 are held by retainer 66. Engaged in the inner races of the ball bearing sets 64 are the ends of a cam shaft 70 which has a centrally offset portion 72 with which the arm 74 of yoke lever 46 is engaged as best shown in FIGS. 3 and 6. Rotation of the cam shaft 70 in a clockwise direction as viewed in FIG. 1 will oscillate the yoke lever 46 on the fulcrums provided by bearing balls 50 against the bias of spring 26 to relieve the bearing nuts 40 of the pressure of the yoke lever and thereby to release the clamping pressure of the brake plate 24 against the plate 18 on the rotor or armature shaft.

To effect such oscillation of the cam shaft 72, a stamping 78 is welded thereto, such stamping having a rearwardly projecting rocker arm 80 to which is pivoted link 82 connected with the armature 84 of solenoid 30.

Also connected with rocker arm 80 is a finger 86 that projects laterally and is provided with a notch at 88. This is to facilitate manual release of the brake which otherwise would be released only upon energization of the electromagnet 30, normally at the time the motor 12 is energized.

For the purpose of manual release of the brake, a handle 90 is rotatably mounted on the end of the housing 34 as best shown in FIG. 2 and FIG. 6. A tension spring 92 normally holds the handle 90 in a position shown in FIGS. 2 and 6. When the handle is rotated clockwise as viewed in FIG. 4, the pin 94 mounted on the handle moves along the arm 86 connected with rocker arm 80 and engages in the notch 88. In the course of its movement along the arm 86, the pin oscillates the rock shaft to release the brake with the same effect as if the brake had been released by energization of magnet 30. However, the movement of the rock shaft does not have quite the same amplitude as if it had been oscillated by the electromagnet. Thus, while the notch 88 will detain the brake actuating parts in brake releasing position without requiring continued manipulation of the handle 90, the first energization of the electromagnet 30 will further retract the arm 86 to disengage its notched portion from the pin 94, whereupon the spring 92 will restore the handle to the position in FIG. 2. When the magnet is again de-energized the brake will be re-engaged. As is well-known, the magnet 30 will normally be wired in parallel with the motor 12. However, any means of rendering it operative concurrently with the motor will be appropriate so far as the present invention is concerned.

It will be apparent that the various pivotal movements of the brake operating parts are achieved without requiring the machining of bearings, since the conventional balls 50 fulcrum the yoke lever 46 and the conventional inexpensive ball bearing sets 64 fulcrum the rock shaft. Moreover, the entire brake is mounted directly from the electric motor independently of the housing 34 and the actuating parts are mounted on a frame attached to the fixed plate of the brake assembly. Thus the only part of the structure carried by the housing is the handle for effecting manual release of the brake and this requires no operating connection with the brake actuating mechanism, the handle parts being engageable with the complementary parts of the brake actuating mechanism only when the handle is rotated.

The springs 98 on the studs 38 separate the brake disks as shown in FIGS. 5 and 6 when the magnet 30 is energized. When the magnet is de-energized, the heavier compression spring 26 oscillates the yoke lever 46 to engage the brake disks and arrest the rotation of the armature shaft 10.

I claim:

1. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disk actuating tension elements connected with one of the disks and having portions engaged by corresponding end portions of the yoke lever at opposite sides of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocker arm connected with the cam shaft for the oscillation thereof in said direction.

2. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disk actuating tension elements connected with one of the disks and having portions engaged by corresponding end portions of the yoke lever at opposite sides of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocker arm connected with the cam shaft for the oscillation thereof in said direction, the means for providing a fulcrum for the yoke lever upon the mounting plate and comprising a pair of bearing balls at opposite sides of the mounting plate, the mounting plate and yoke lever having opposing sockets in which the bearing balls are partially received.

3. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disks actuating tension elements connected with one of the disks and having portions engaged by corresponding end portions of the yoke lever at opposite sides of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocket arm connected with the cam shaft for the oscillation thereof in said direction, said tension means comprising bolts extending through portions of the yoke lever and having nuts provided with transversely aligned wedge-shaped extremities engaged with the yoke lever.

4. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disk actuating tension elements connected with one of the disks and having portions engaged by corresponding end portions of the yoke lever at opposite sides of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocker arm connected with the cam shaft for the oscillation thereof in said direction, the means for rotatably supporting the cam shaft comprising ball bearing sets having retainers connecting them individually to the mounting plate in axial alignment with each other and spaced to receive between them portions of the yoke lever with which the cam is engaged.

5. A brake according to claim 1 in which the cam shaft rocker arm is provided with a notched finger and in further combination with a housing enclosing said mechanism, a rotor operatively mounted upon the housing, a spring biasing the rotor in one direction of oscillation, a handle for actuating the rotor in opposition to the bias of said last-mentioned spring, and a pin mounted on the rotor and movable along said finger during rotor operation in a direction to oscillate the cam shaft, said pin being receivable into the notch for releasably holding the rotor against the bias of said spring.

6. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disk actuating tension elements connected with one of the disks and having portions engaged by corresponding end portions of the yoke lever at opposite sides of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocker arm connected with the cam shaft for the oscillation thereof in said direction, said cam shaft comprising a rod having a central portion offset to constitute the cam and having a stamping welded thereto and provided with an outwardly projecting portion constituting said rocker arm.

7. In a brake, the combination with a mounting plate, of first and second disks at one side of the mounting plate and operating mechanism at the other side of the mounting plate for selectively engaging and releasing said disks, said mechanism comprising a yoke lever extending transversely of the mounting plate, disk actuating tension elements connected with one of the disks and having portions engaged by corresponding end portions of the yoke lever at opposite sides of the mounting tions of the yoke lever at opposite side of the mounting plate, means providing a fulcrum for the yoke lever upon the mounting plate, means biasing the yoke lever about said fulcrum in a direction to exert tension through said elements upon the disk with which such elements are connected, and means for relieving such tension comprising a cam shaft having a cam engaged with the yoke lever and arranged to act thereon in a direction in opposition to the biasing means, the mounting plate having means for rotatably supporting the cam shaft, and a rocker arm connected with the cam shaft for the oscillation thereof in said direction, a solenoid mounted on the mounting plate and having an armature provided with a link connecting it to said arm for the oscillation of said cam shaft.

8. A brake applicable to a motor having a housing and projecting armature shaft and comprising a mounting plate, means for connecting the mounting plate to the motor housing in spaced relation thereto, the mounting plate having a central aperture, a hub adapted to be mounted on the armature shaft in registry with said aperture, a brake disk connected with the mounting plate, a second brake disk reciprocable on the hub and connected for rotation therewith, a third brake disk movable to and from the first mentioned brake disk and to and from clamping engagement with the second brake disk, bolts connected with the third brake disk and extending past the second brake disk and the first brake disk and the mounting plate, fulcrum heads on the bolts and having transversely aligned wedge portions, a yoke lever having corresponding ends engaged with said wedge portions and having intermediate fulcrumed portions at opposite sides of the mounting plate, the fulcrumed portions of the lever and the adjacent portions of the mounting plate having complementary sockets, balls partially received in the respective sockets and constituting means upon which the fulcrumed portions of the yoke lever are pivoted, a spring seat connected with the mounting plate and opposed to the yoke lever at the opposite side of said balls from the aforesaid fulcrum heads, a compression spring confined between the yoke lever and the spring seat, the yoke lever having a movable ear portion intermediate the balls and offset therefrom with which the compression spring is engaged, aligned ball bearing sets mounted on the mounting plate at opposite sides of the ear portion, retaining means holding the ball bearing sets to the mounting plate, a rock shaft mounted in the ball bearing sets and having an intermediate portion offset to constitute a crank engaged with said ear to oscillate the yoke lever in opposition to the bias of said compression spring, means connected with the rock shaft providing a rocker arm for the oscillation of the rock shaft, and means for actuating said arm to oscillate the rock shaft and the yoke lever in opposition to the bias of said spring in a direction to relieve the third disk and the bolts connected therewith from the pressure exerted by said spring.

9. A brake according to claim 8 in which the mounting plate has openings in which the ball bearing sets are disposed, the brake disk first mentioned being connected with the mounting plate to constitute said openings as pockets for holding the ball bearing sets.

10. A brake according to claim 8 in further combination with a brake housing connected with the mounting plate and enclosing said brake disks, the motor housing having a shoulder with which peripheral portions of the brake housing are engaged.

11. The combination with a rotor having at least one disk mounted thereon, coacting disk means supported for frictional engagement with said one disk, said disk and disk means being substantially coaxial, and means for selectively engaging and relieving frictional engagement of said coacting disk means with said one disk, said means comprising a mounting plate, a yoke lever extending transversely of the mounting plate, a pair of bearing balls at opposite sides of the mounting plate and engaged by the yoke lever, said balls constituting fulcrum means for pivoting the yoke lever for movement with respect to the mounting plate, the mounting plate and yoke lever having opposing sockets in which the bearing balls are partially received, means for exerting bias on the yoke lever in one direction about the fulcrum means thus provided, means connecting the yoke lever with said coacting disk means for transmitting yoke lever movement to said disk means, and electromagnetic means for actuating the lever in a direction opposite to said bias.

References Cited by the Examiner

UNITED STATES PATENTS 2,188,766   1/1940   Buckley _____ 188—171 X
3,139,160   6/1964   Hink et al. _____ 188—171

ARTHUR L. LA POINT, *Primary Examiner.*

DUANE G. REGER, *Examiner.*